No. 742,575. PATENTED OCT. 27, 1903.
M. T. BRANSFIELD.
HORSE STOCK.
APPLICATION FILED JUNE 25, 1903.
NO MODEL. 2 SHEETS—SHEET 1.
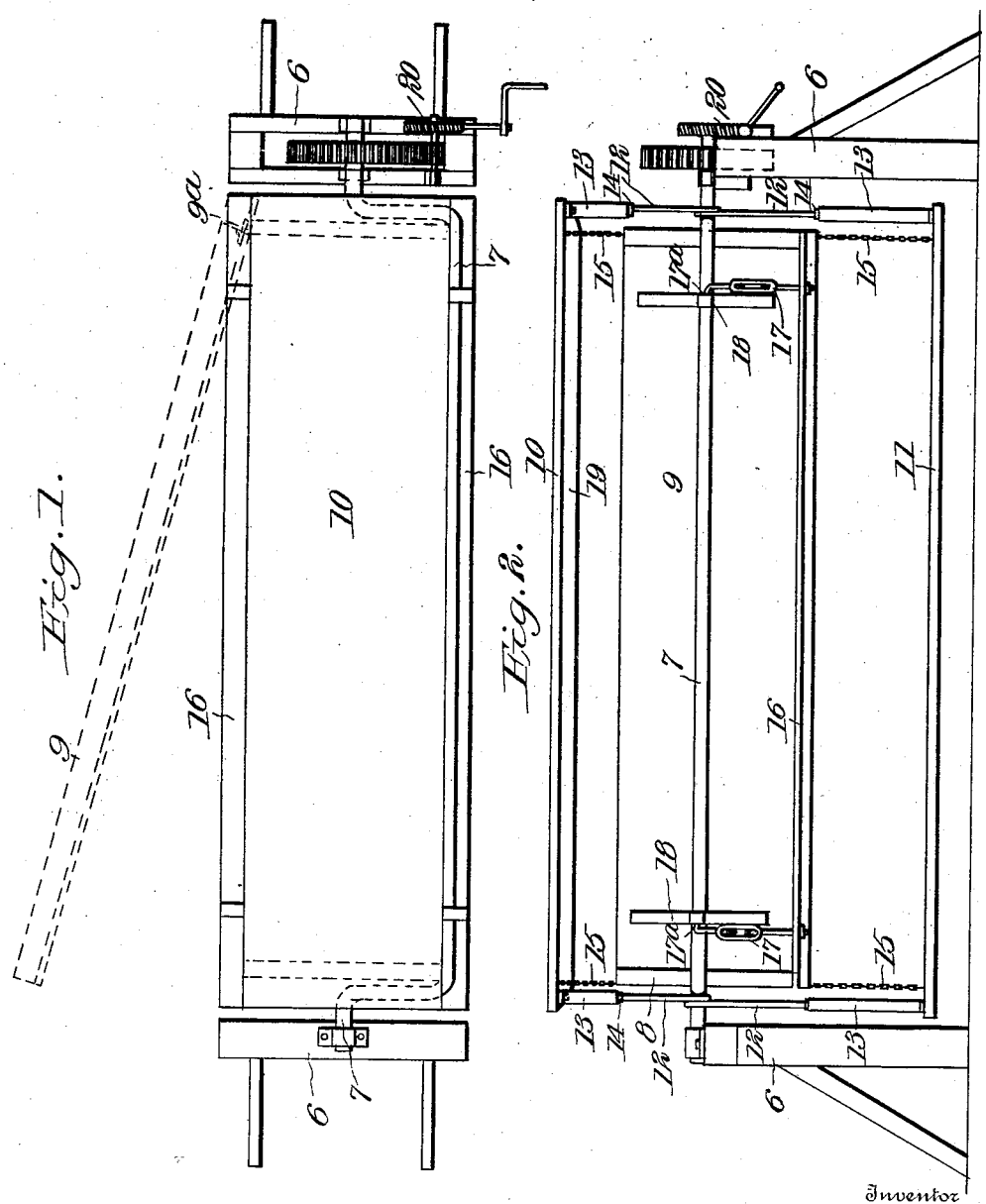
Witnesses
C. H. Walker
Geo. E. Tew
Inventor
Michael T. Bransfield
By Milo B. Stevens & Co
Attorneys

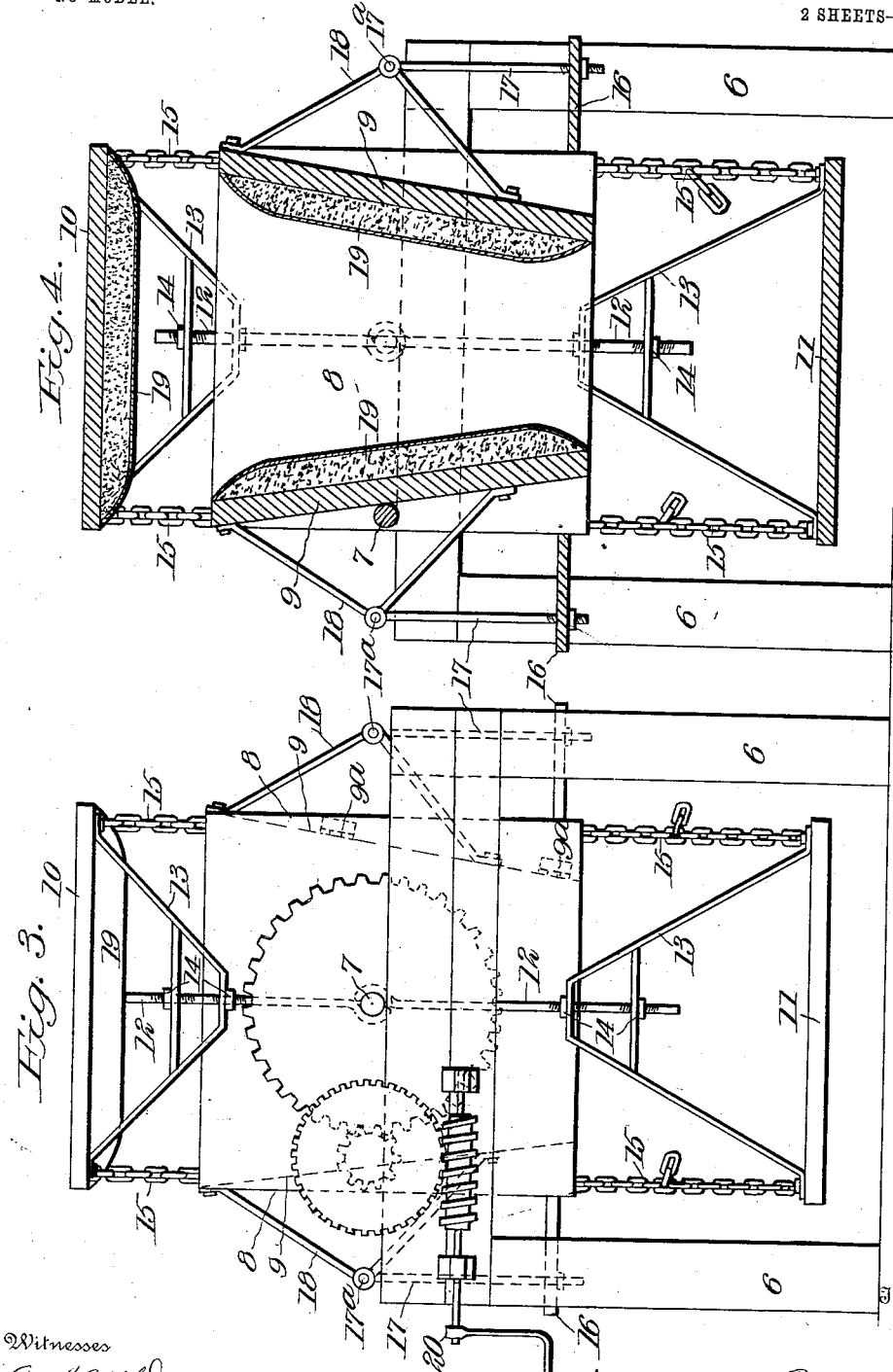

No. 742,575.

Patented October 27, 1903.

UNITED STATES PATENT OFFICE.

MICHAEL T. BRANSFIELD, OF CHICAGO, ILLINOIS.

HORSE-STOCK.

SPECIFICATION forming part of Letters Patent No. 742,575, dated October 27, 1903.

Application filed June 25, 1903. Serial No. 163,076. (No model.)

*To all whom it may concern:*

Be it known that I, MICHAEL T. BRANSFIELD, a citizen of the United States, residing at Chicago, in the county of Cook and State of Illinois, have invented new and useful Improvements in Horse-Stocks, of which the following is a specification.

This invention relates particularly to stocks for holding horses during shoeing, and has for its object to form an improved device of that kind in which the horse will be so held as to be helpless, with his hoofs free to ready access for the purpose of shoeing.

The device has the particular characteristic that it is rotatable to turn the horse upside down, so that his hoofs may be got at to be shod from above.

The invention is illustrated in the accompanying drawings, and referring thereto—

Figure 1 is a top plan view of the stock. Fig. 2 is a side elevation thereof. Fig. 3 is an end elevation thereof. Fig. 4 is a vertical cross-section.

Referring specifically to the drawings, 6 indicates fixed frames at the end of the stock, and the axle 7, which supports the box or cage in which the horse is confined, is mounted in bearings on the top of the frames. The axle is of sufficient size and strength to support the weight of the animal and the cage, and it is cranked around the cage, as shown.

The cage in which the animal is confined comprises end pieces 8 and sides 9, joined thereto. One of these sides is rigidly fixed between the end pieces, being the side adjacent the axle. The other side is openable, being hinged at one end, as indicated at 9ª, so that it will swing outwardly, as indicated in dotted lines in Fig. 1, to permit the entry of the horse into the box. This box or cage is securely fastened to the shaft or axle and is rotatable therewith.

A top for the cage is indicated at 10 and a bottom at 11. These are respectively supported by hangers consisting of bars 12 and brackets 13 at each end thereof. The bars which support the top and bottom may conveniently be formed of round iron having loops or eyes at the inner end through which the axle extends. The brackets are preferably made of flat iron having holes through which the outer ends of the rods extend, and said ends are threaded to receive nuts 14, one above and one below the brackets, whereby the size of the cage may be adjusted to accommodate horses of different heights and the brackets clamped in adjusted position. The top and bottom are further supported by chains 15, extending from the corners thereof to the corners of the end pieces.

To induce and facilitate the entry of a horse into the stock, the top may be swung laterally on the shafts by loosening the chains on one side. This will permit the top to be swung sidewise from above the box until the horse is in position, when it may be swung back and the chains fastened again. The bottom 11 is capable of being swung laterally in the same manner after the device shall have been turned upside down. In such position the bottom 11 forms the top of the structure, and in order to get at the hoofs of the horse the chains on one side are loosened and the said part swung backwardly to uncover the hoofs of the horse. After the shoeing is finished the part is turned up again to form the bottom or floor, when the stock is turned back to its original position.

On each side of the box is a platform 16, hung by rods 17, which are hinged at 17ª to brackets 18, attached to the side of the box. The platforms are free to swing to reverse position when the stock is rotated, so that when the stock is turned upside down they swing out and down against the edge of the top 10, which then forms the bottom of the stock, in which position they are convenient for the shoer to stand on and get at the horse's hoofs. The top and sides are suitably padded, as indicated at 19, to prevent injury to the animal. The stock is rotated by crank 20, connected by worm and spur gearing to the shaft.

It is thought that the manner of operation will be clearly evident from the above description. When the stock is reversed, the horse will be held on its back with its feet projecting upwardly, in which position it will be impossible for him to do himself or the smith any injury.

What I claim as new, and desire to secure by Letters Patent, is—

1. An animal-stock comprising a cage, having an openable bottom, and means to turn the cage upside down.

2. An animal-stock comprising a cage, having an openable top and bottom, and means to rotate the cage.

3. An animal-stock comprising a cage supported and rotatable upon an axle and having an openable bottom.

4. In an animal-stock, in combination, an axle, and a cage supported and rotatable thereon and having a top and bottom pivotally hung from the axle, to swing laterally thereon.

5. In an animal-stock, a rotatable cage having an openable side and bottom.

6. An animal-stock comprising a cage, an axle therefor, supported at its ends and cranked around the cage, and an openable side, top and bottom for the cage.

In testimony whereof I have signed my name to this specification in the presence of two subscribing witnesses.

MICHAEL T. BRANSFIELD.

Witnesses:
H. G. BATCHELOR,
SIGNA FELTSKOG.